US006798187B1

(12) United States Patent
Czarnecki

(10) Patent No.: US 6,798,187 B1
(45) Date of Patent: Sep. 28, 2004

(54) GENERATOR STATUS INFORMATION DISPLAY FOR POWER TRANSFER SWITCH

(75) Inventor: Neil A. Czarnecki, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 403 days.

(21) Appl. No.: 09/963,935

(22) Filed: Sep. 26, 2001

(51) Int. Cl.$^7$ .............................. G01R 11/63; G01R 7/00
(52) U.S. Cl. ............................. 324/103 P; 324/103 R; 324/141; 324/142
(58) Field of Search ........................ 324/103 R, 103 P, 324/113–116, 141–142, 156–157; 307/43, 64, 85, 125, 149; 361/327, 601, 627, 634, 641

(56) References Cited

U.S. PATENT DOCUMENTS

| 3,796,951 | A | * | 3/1974 | Joseph |
| 3,805,036 | A | * | 4/1974 | Michaud et al. |
| 4,092,591 | A | * | 5/1978 | Lozowski |
| 4,096,435 | A | * | 6/1978 | Sabe |
| 4,459,548 | A | * | 7/1984 | Lentz et al. |
| 4,620,149 | A | * | 10/1986 | Cooper |
| 4,775,828 | A | * | 10/1988 | Watley et al. |
| 4,812,744 | A | * | 3/1989 | Havel .......................... 324/115 |
| 5,412,312 | A | * | 5/1995 | Crass et al. ................. 324/122 |
| 5,751,819 | A | * | 5/1998 | Dorrough |
| 5,895,981 | A | * | 4/1999 | Flegel |
| 5,986,557 | A | * | 11/1999 | Clarke |
| 6,055,145 | A | * | 4/2000 | Lagree et al. |
| 6,107,701 | A | * | 8/2000 | Flegel .......................... 307/125 |
| 6,531,790 | B2 | * | 3/2003 | Panuce et al. ................. 307/64 |

* cited by examiner

Primary Examiner—Kamand Cuneo
Assistant Examiner—Minh N. Tang
(74) Attorney, Agent, or Firm—Andrus, Sceales, Starke & Sawall, LLP

(57) ABSTRACT

A power transfer arrangement is provided for supplying power from a generator to the electrical system of a building in the event of a utility power interruption. The power transfer arrangement has a power transfer switching mechanism adapted for interconnection with the building electrical system and includes a cabinet having panel structure provided with various electrical components for transferring power to various load circuits. The power transfer arrangement is improved by a generator status information display mounted on the cabinet for separately measuring and simultaneously displaying actual wattage and voltage supplied by the generator to the load circuits.

11 Claims, 4 Drawing Sheets

GENERATOR STATUS INFORMATION DISPLAY FOR POWER TRANSFER SWITCH

FIELD OF THE INVENTION

This invention relates broadly to a power transfer arrangement for providing power to the electrical system of a building and, more particularly, pertains to a power transfer arrangement provided with a monitor indicating the health or condition of the generator during utility power interruption.

BACKGROUND AND SUMMARY OF THE INVENTION

Portable generators may be used in certain situations to feed electrical power to residential and commercial load circuits during a utility power outage. These systems in their most basic form include a generator or other auxiliary source of power positioned exteriorly of a building. The generator is connected to a power inlet box and a transfer switching mechanism which continues the electrical path through integral overcurrent protectors associated with the transfer switching mechanism to supply power to certain selected circuits of the load center as determined by the transfer switching mechanism circuit breakers. The circuits of the transfer switching mechanism are wired to selected circuits of the load center through wiring housed within a conduit extending between the load center and the transfer switching mechanism.

The present invention relates to a power transfer switching mechanism for interposition between an auxiliary power source and electrical load center of a building. Such a switching mechanism typically includes a cabinet having a front panel which may be provided with a set of switches and overcurrent protectors, each of which corresponds to a particular load circuit. A direct electrical connection is established between the power inlet box and the transfer switching mechanism as set forth in assignee's U.S. Pat. No. 6,107,701 issued Aug. 22, 2000. The overcurrent protectors are mounted to a bus bar in the cabinet for receiving power from the generator to provide auxiliary power to selected circuits of the load center. The set of switches associated with the overcurrent protectors is mounted to the panel for controlling the supply of generator power from the switching mechanism to the building load center. Power indicating structure in the form of a pair of watt meters is typically included in the panel for representing the amount of power provided by the generator. Traditionally, one watt meter is associated with one group of load circuits and the other watt meter is associated with the remaining group of load circuits. Typically, one visually monitors the watt meters to see that the generator power to the loads remains balanced. Each watt meter has a transparent window having a support member for mounting a black-on-white wattage scale visible through the window, and an indicator mounted for movement along the scale in response to the supply of generator power.

It is important to understand that the so-called watt meters do not measure and display real time wattage being supplied by the generator. Instead, these watt meters are actually ammeters which measure and display the current or amperage being carried by the generator. The current is represented as wattage on the scale by multiplying it by an average constant voltage of 125 volts so that only an approximation of generator power is available on the front panel of the switching mechanism. In addition, the prior art power indicating structure also does not measure and display the real time generator output voltage which is not constant and can vary from 104 to 140 volts. Monitoring the real time voltage can be useful in detecting an over voltage condition which indicates a more serious problem in the voltage regulator or miswiring of the system. In addition, the prior art watt meters have a construction which makes visual monitoring of the generator status difficult at distances spaced from the front panel of the switching mechanism. It is also noted that the prior art power indicating structure does not include any type of indicator for confirming when utility power is restored so that the operator can correct the configuration of switches on the switching mechanism.

Accordingly, it would be desirable to provide the power transfer switching mechanism with an enhanced power indicating structure embodied in a generator status information display which accurately measures and more vibrantly displays real time wattage and voltage supply by the generator during a utility power interruption. It would also be desirable to provide the power transfer switching mechanism with an indicator which signifies whether or not utility power is driving the loads.

It is one object of the present invention to provide a generator condition monitor for quickly ascertaining the health or status of an electrical power system having capability of using utility or generator power.

It is also an object of the present invention to provide a generator status information display which employs tri-color, light emitting diodes (LEDs) to show actual wattage and voltage levels when generator power is operational in the electrical power system.

It is an additional object of the present invention to provide a display field on the front panel of a power transfer switching mechanism with a climbing bar graph wherein both the height of the graph and the color of the graph are indicative of the real time power consumption status of the generator.

It is a further object of the present invention to provide a display field on the front panel of a power transfer switching mechanism with a moving dot graph wherein both the relative position of the dot and the color of the dot are indicative of the real time output voltage of the generator.

It is yet another object of the present invention to provide a display field on the front panel of the power transfer switching mechanism with an indicator showing whether or not utility power is available through the electrical power system.

In one aspect of the invention, a power transfer arrangement is provided for supplying power from a generator to the electrical system of a building in the event of a utility power interruption. The power transfer arrangement has a power transfer switching mechanism adapted for interconnection with the building electrical system and includes a cabinet having panel structure provided with various electrical components for transferring power to various load circuits. The switching mechanism is improved by a generator status information display mounted on the cabinet for separately measuring and simultaneously displaying actual wattage and voltage supply by the generator to the load circuits. The generator status information display includes at least a three color LED scheme for indicating acceptable, cautionary and overage conditions. The generator status information display is comprised of a pair of electronic wattage graphs, each wattage graph being flanked by an electronic voltage graph. The generator status information display also includes an indicator representing the availability of utility power.

In another aspect of the invention, a generator condition monitor is provided for a power transfer switching mechanism adapted for interconnection with a building electrical system during a utility power interruption. The monitor includes at least one climbing bar graph where both the size and color of the graph are indicative of real time power consumption of the generator. The monitor also includes at least one moving dot graph wherein the relative position and color of the dot are indicative of the real time output voltage of the generator. The climbing bar graph and the moving dot graph both employ red, green and yellow LEDs to represent various condition levels of the generator. The climbing bar graph includes twenty LED segments and the moving dot graph includes ten LED segments. The monitor includes a single LED indicator representing the availability of utility power. The moving dot graph employs yellow LEDs to signify output voltages below 108 volts and above 132 volts and red LEDs to signify output voltages below 104 volts and above 136 volts. The climbing bar graph employs yellow LEDs to signify power consumption between 90 and 100 percent of capacity and red LEDs to signify power consumption above 100 percent of capacity.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
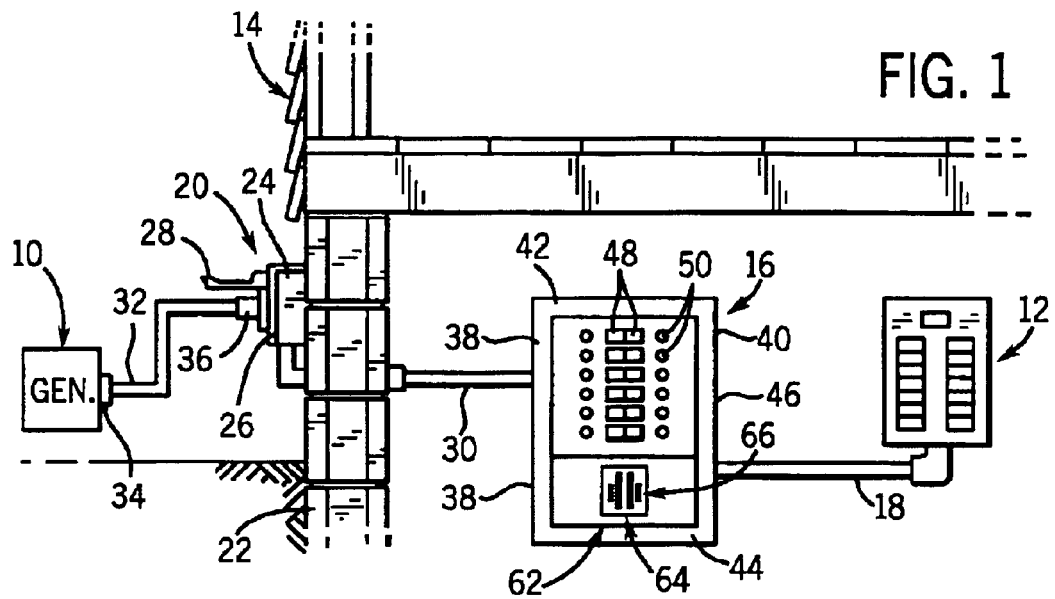
FIG. 1 is a schematic representation showing a power transfer arrangement interposed between a remote power inlet arrangement fed by a portable power generator and an electrical panel associated with a building, the power transfer arrangement being provided with a generator health or condition monitor embodying the present invention.

FIG. 1 shows a power inlet arrangement for interconnecting a portable generator 10 with a main electrical panel or load center 12 located in the interior of a building 14. In the power inlet arrangement of FIG. 1, a manual power transfer switching mechanism 16 constructed in accordance with the invention is mounted adjacent main panel 12, and is interconnected therewith via a series of wires enclosed by a conduit 18 extending between main panel 12 and switching mechanism 16. The general construction of the power transfer switching mechanism 16 may be such as manufactured by Reliance Controls Corporation of Racine, Wisc. under the designation GEN/SWITCH.

The power inlet box 20 is mounted to the wall of building 14, as shown at 22. Power inlet box 20 includes an external housing including a series of walls such as 24, and a recessed power inlet 26 mounted to a front wall of the housing. A cover 28 is mounted to the front wall of the housing via a hinge structure and is movable between an open position, as shown in FIG. 1, and a closed position in which cover 28 encloses recessed power inlet 26 when not in use. A conduit 30 extends between inlet box 20 and switching mechanism 16 and provides a direct electrical connection therebetween. Appropriate wiring and connections are contained within inlet box 20 and conduit 30 for providing an electrical path between inlet box 20 and switching mechanism 16.

A power cord 32 extends between generator 10 and power inlet box 20. Cord 32 includes a plug 34 at one end, which is engageable with the power outlet of generator 10. Cord 32 further includes a connector 36 at the end opposite plug 34. Connector 36 is engageable with recessed power inlet 26 for transferring power generated by generator 10 to power inlet box 20, which is then supplied through the wiring and conduit 30 to switching mechanism 16, and from switching mechanism 16 through the wiring in conduit 18 to main panel 12. In this manner, generator 10 functions to provide power to selected circuits of main panel 12 during a power outage. In this arrangement, the user first connects cord 32 between generator 10 and power inlet box 20, and then commences operation of generator 10.

While the drawings illustrate a conduit 30 extending from power inlet box 20 and power transfer switching mechanism 16, it is understood that any other approved wiring method may be utilized such as encased wiring conventionally known as non-metallic, sheathed cable for establishing a connection between the power inlet box 20 and power transfer switching mechanism 16.

Switching mechanism 16 is interposed between load center 12 and inlet box 20. Switching mechanism 16 includes an enclosed cabinet defining a pair of side walls 38, 40, a top wall 42 extending between the upper ends of side walls 38, 40, a bottom wall 44 extending between and interconnecting the lower ends of side walls 38, 40, a front panel 46 and a rear panel (not shown). As is well known, a top portion of front panel 46 carries a set of switches 48 and overcurrent protective devices 50 associated therewith, each of which corresponds to a particular load circuit. Switches 48 are employed to effect the actual transfer of power from the generator 10 to various loads. For example, one switch 48 may control power to a furnace blower, another switch 48 may control power to a sump pump, and yet another switch 48 may control power to a refrigerator. Overcurrent protective devices 50 protect individual circuits from an abnormality by breaking the circuit such as in the event of a current overload.

Each of the switches 48 on front panel 46 of switching mechanism 16 is a triple throw construction having a respective lever which is manually actuable to a LINE position when utility power is available, a GEN position when auxiliary or generator power replaces utility power and an OFF position which signifies no electrical power is being transferred to the load circuits. Switches 48 are designed such that each lever must move to the OFF position before being placed in the GEN or LINE position. Although not shown, in the case of double pole circuits, a tie bar interconnects two adjacent switches 48 together.

Figure 2:
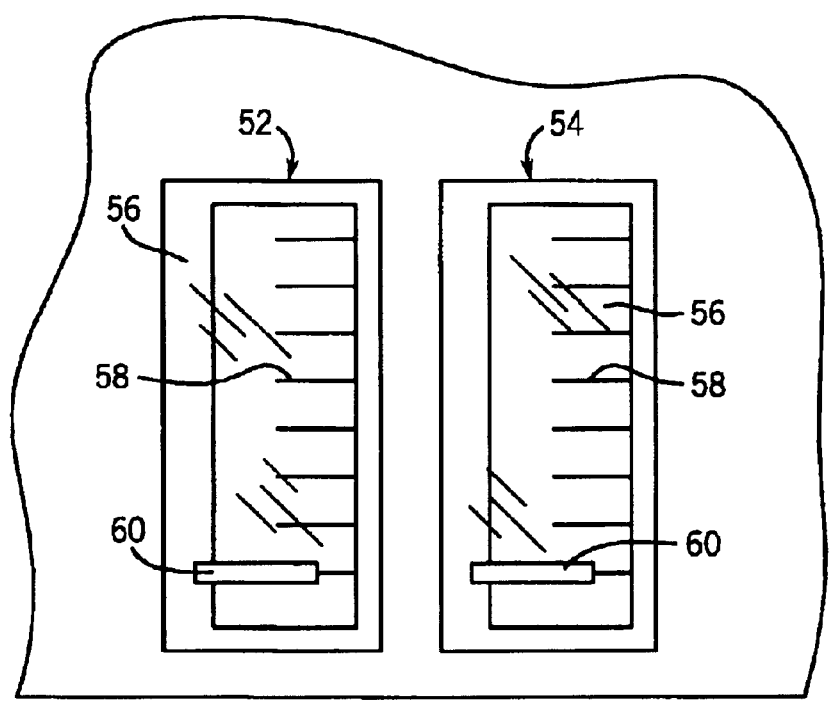
FIG. 2 is an enlarged, partial view of a prior art power transfer arrangement employing dual analog panel meters for representing the wattage supply by the generator when connected to various loads.

In the event of a utility power interruption, the generator 10 is used to provide power to as many as ten different load circuits. It is customary practice in the prior art to oversee the handling of generator power to the load circuits by also providing the front panel 46 of power transfer switching mechanism 16 with power indicating structure in the form of a pair of analog (or digital) panel meters 52, 54 (FIG. 2). These panel meters 52, 54, which have been referred to as "watt meters", are employed in an attempt to display the amount of power supplied to power transfer switching mechanism 16 from generator 10. Each prior art watt meter 52, 54 has a convexly-shaped forward portion defining a transparent window 56 having a support member for mounting a black-on-white wattage scale 58 visible through the window 56, and an indicator 60 mounted for movement along each scale 58 in response to the supply of generator power. Traditionally, one watt meter 52 is associated with one group of load circuits, and the other watt meter 54 is associated with the remaining group of load circuits. Typically, one visually monitors the watt meters 52, 54 to see that power to the loads remains substantially balanced.

There are several drawbacks which occur when using the prior art power indicating structure. Most importantly, the watt meters 52, 54 do not measure and display real time wattage being supplied by the generator 10. Instead, the watt meters 52, 54 are actually ammeters which measure and display the current being carried by the generator 10. The current is represented as wattage on the scale 58 by multiplying it by an average constant voltage of 125 volts so that only an approximation of generator power is available at the bottom of the front panel 46. The prior art power indicating structure also does not include any measure or display of real time generator voltage which, in fact, may vary from 104 to 140 volts. Monitoring the real time voltage can be useful in detecting an over voltage condition which indicates a potential problem with the generator voltage regulator or with miswiring of a 240 VAC two phase system. In addition, the watt meters 52, 54 have a construction which makes visual monitoring of the generator status difficult at distances spaced from the front panel 46. It is also noted that the prior art power indicating structure does not contemplate an indicator to show when utility power is restored so that the operator can correct the configuration of switches 48 on the power transfer switching mechanism 16.

In accordance with the invention, the lower portion of the front panel 46 of the power transfer switching mechanism 16 includes a unique generator status information display and condition monitor 62 for measuring and displaying quickly and accurately the real time power consumption and voltage of the generator 10. The display 62 includes at least one power consumption climbing bar graph 64 (FIG. 1) wherein both the size of the bar and the color of the bar are indicative of the operational status of the generator 10. The display also includes at least one output voltage moving dot graph 66 (FIG. 1) wherein both the relative position of the dot in reference to the center of the display 62 and the color of the dot are indicative of the operational status of the generator 10. Both graphs 64, 66 are typically protected by a transparent window.

Figure 4:
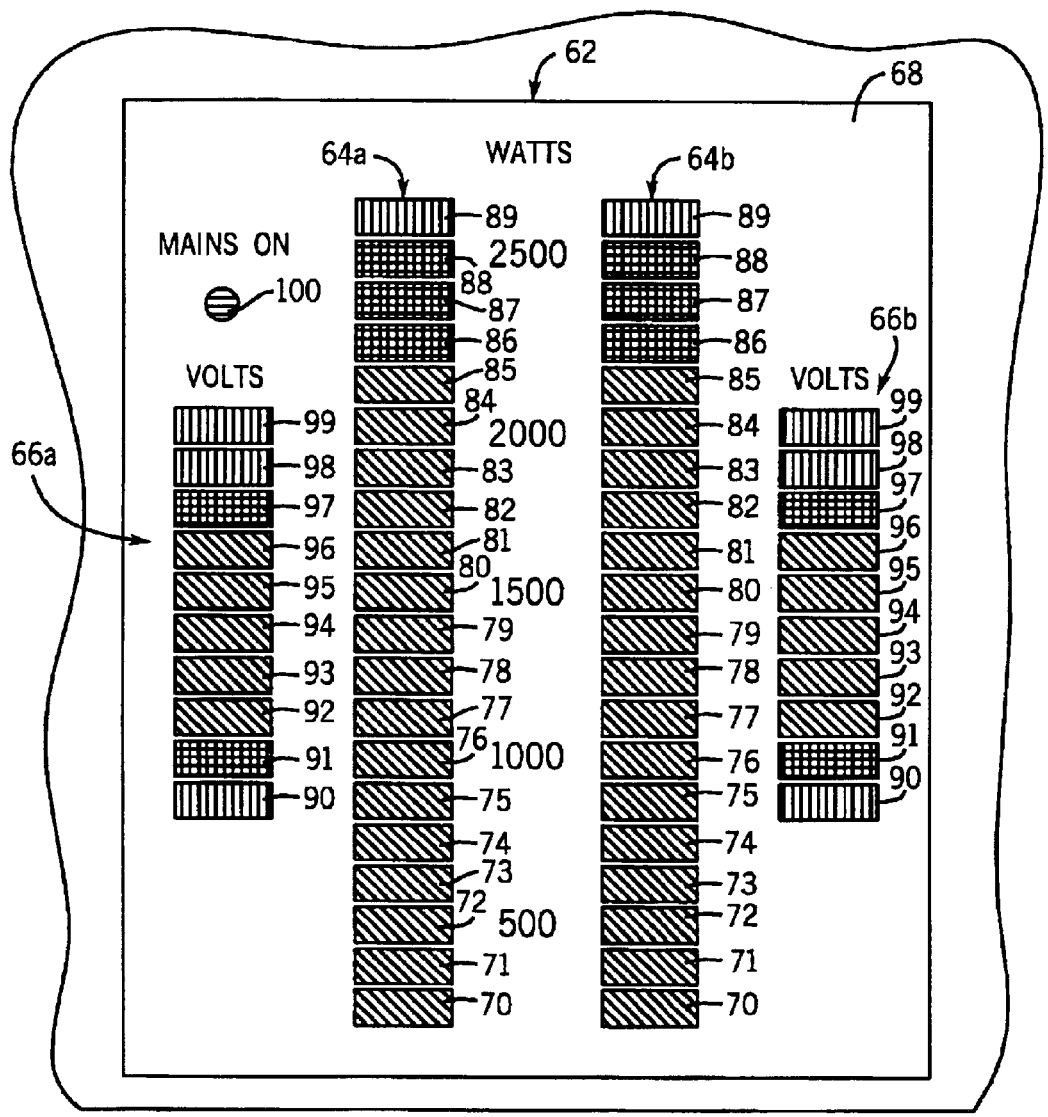
FIG. 4 is a view similar to FIG. 3 but showing a comprehensive color map for a generator health or condition monitor.

Referring to FIG. 4, the preferred embodiment shows a comprehensive color map for the power (wattage) display 64 in the form of a pair of displays 64a, 64b which are placed at an inboard position of a display field 68. Each display 64a, 64b has twenty custom, light emitting diode (LED) segments 70 through 89 in which the lower sixteen LEDs are colored green, the three median LEDs are colored yellow, and the highest LED is colored red, utilizing the commonly understood color coding scheme of "green is good, yellow is caution, red is bad." The wattage displays 64a, 64b are driven in such a manner that multiple LEDs are lit, creating a columnar graph effect. The display range covers the normal operating conditions, in intuitively understandable increments based on the fill power capability of a particular generator, thus easily leading the operator through the interventional decision making process. In this example, for instance, the LEDs light in the following steps:

| | |
|---|---|
| Segment 89 - red | above 100% of capacity |
| Segment 88 - yellow | at 100% of capacity |
| Segment 87 - yellow | at 95% of capacity |
| Segment 86 - yellow | at 90% of capacity |
| Segment 85 - green | at 85% of capacity |
| Segment 84 - green | at 80% of capacity |
| Segment 83 - green | at 75% of capacity |
| Segment 82 - green | at 70% of capacity |
| Segment 81 - green | at 65% of capacity |
| Segment 80 - green | at 60% of capacity |
| Segment 79 - green | at 55% of capacity |
| Segment 78 - green | at 50% of capacity |
| Segment 77 - green | at 45% of capacity |
| Segment 76 - green | at 40% of capacity |
| Segment 75 - green | at 35% of capacity |
| Segment 74 - green | at 30% of capacity |
| Segment 73 - green | at 25% of capacity |
| Segment 72 - green | at 20% of capacity |
| Segment 71 - green | at 15% of capacity |
| Segment 70 - green | under 15% of capacity |

Only one red segment 89 is used for the overpower condition, as the generator should not be operated in an overpower condition for any period of time under any circumstances. One can see that there are three segments 86–88 used to display the cautionary condition, indicative of power usage at or above 90% capacity of the generator system. In the preferred embodiment, the top capacity of wattage is shown by indicia to be slightly beyond 2500 watts.

The preferred embodiment also shows a comprehensive color map for the voltage display in the form of a pair of displays 66a, 66b which are placed at the outboard edges of the display field 68. Each display 66a, 66b, has ten custom, light-emitting diode (LED) segments 90–99 in which the interior five LEDs are colored green, the two median LEDs are colored yellow, and the remaining extreme LEDs are colored red. This again utilizes the commonly-understood color-coding scheme of "green-is-good, yellow-is-caution, red-is-bad", thus requiring little or no additional operator interpretation. The voltage displays are driven in such a manner that only a single LED (per phase) is lit at any time, and the display range covers only that portion which would be considered "normal" operating conditions. That is, the full range of zero to maximum voltage is not displayed in equal increments, as it is unnecessary for the operator to know how "bad" is "bad"—only that voltage is "bad" and therefore the system requires intervention. In this example, for instance, the LEDs light in the following manner:

| | |
|---|---|
| Segment 99 - red | above 140 volts |
| Segment 98 - red | near 136 volts |
| Segment 97 - yellow | near 132 volts |
| Segment 96 - green | near 128 volts |
| Segment 95 - green | near 124 volts |
| Segment 94 - green | near 120 volts |
| Segment 93 - green | near 116 volts |
| Segment 92 - green | near 112 volts |
| Segment 91 - yellow | near 108 volts |
| Segment 90 - red | below 104 volts |

One can see that the two segments 98, 99 are used to display the overvoltage condition—one (the "near 136 volts" segment, indicates a potential problem with the generator's voltage regulator, the other (the "above 140 volts")

may be used to indicate a mis-wiring of a 240 VAC 2-phase (120-0-120) system. A third red segment 90 indicates a severe under voltage condition (below 104 volts). The green, nominal-condition segments 92–96 light to indicate voltages which are within +/−10% of 120 volt "normal" operating voltage.

FIG. 4 also shows a single LED 100 positioned above the left side voltage display 66a. This LED 100 is an indicator that when lit shows utility power (MAINS) has been restored and signals the operator that switches 48 must be reconfigured as described previously.

Figure 3:
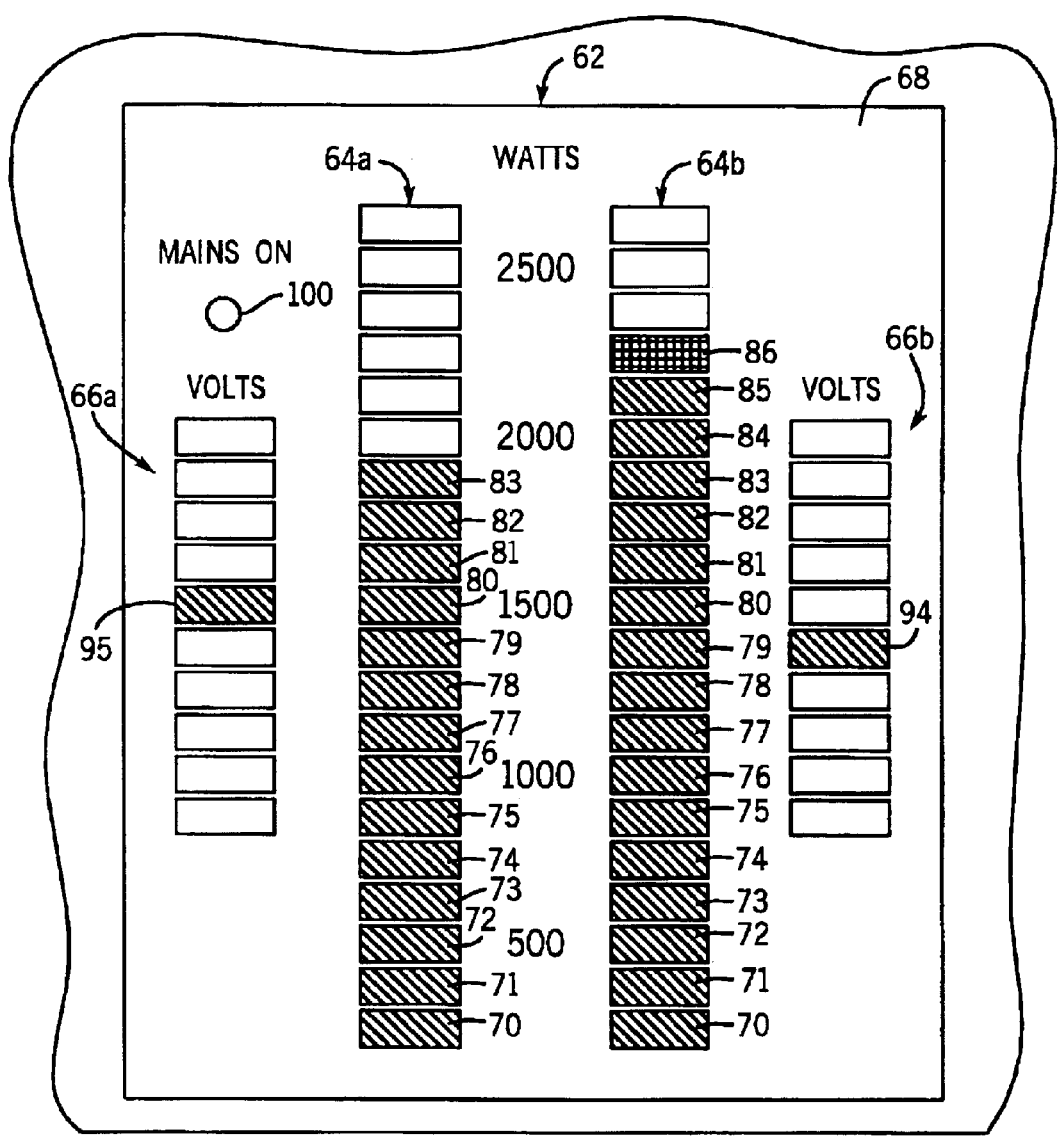
FIG. 3 is an enlarged, partial view of the power transfer arrangement of FIG. 1 showing the generator health or condition monitor for measuring and displaying the true voltage and wattage supplied by the generator in a typical utility power outage situation.

FIG. 3 illustrates a working example of the generator status information display 62 wherein wattage display 64a indicates the generator handling its load circuits is at 75% of capacity and that the voltage display 66a shows an output voltage near 124 volts. Wattage display 64b indicates a generator handling of those low circuits is at 90% of capacity and that the voltage display 66b shows an output voltage near 120 volts. It is noted that the single LED 100 remains unlit while generator power is being transferred to the load. Using this invention, the health or condition of the system can be determined by the operator in a matter of tenths of a second, and from a considerable distance (greater than 25 feet) from the front panel 46 of the power transfer switching mechanisms 16, and thus, a further and more detailed examination of panel 46 is rendered unnecessary. Only in the event of a display which deviated from the easily perceived norm would the operator be required to investigate the details of the system condition.

Figure 5:
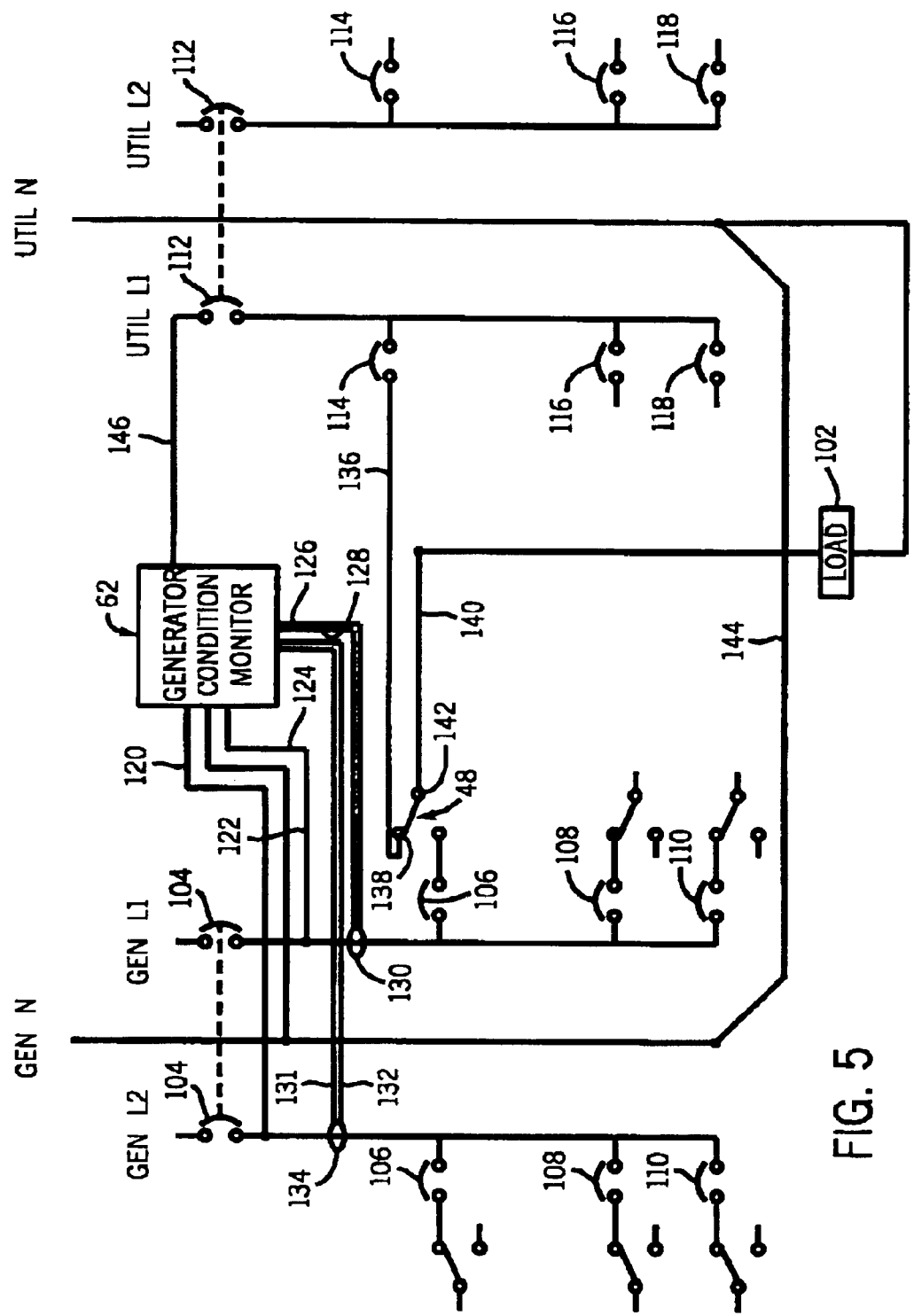
FIG. 5 is wiring diagram showing the interconnection of the generator health or condition monitor to the generator and utility power sources.

FIG. 5 shows a wiring diagram for incorporating the generator condition monitor 62 into the electrical system. For simplicity, the wiring diagram is shown for a single load 102 (even though the generator 10 is typically used with up to ten different loads). A generator has a first generator line L1 and a second generator line L2, each provided with a double pole, main circuit breaker 104 and a series of pop out circuit breakers 106, 108 and 110. A generator neutral line N is shown connected to the utility neutral line N. Main power is supplied through first utility line L1 and a second utility line L2, each provided also with a double pole, main circuit breaker 112 and a series of pop out circuit breakers 114, 116 and 118. Three voltage leads 120, 122, 124 interconnect the generator L1, L2 and neutral N with the monitor 62. Two current leads 126, 128 run between the monitor 62 and a toroidal current transformer 130 on generator L1. Two further current leads 131, 132 interconnect the monitor 62 with a toroidal current transformer 134 on generator L2. A wire 136 runs from a movable contact 138 on switch 48 to the pop out circuit breaker 114 on utility L1. Another wire 140 runs from a fixed contact 142 on switch 48 to the load 102 which is, in turn, connected to the utility neutral N. A further wire 144 interconnects the utility neutral N with the generator neutral N. Yet another wire 146 interconnects utility L1 with the monitor 62 so that the single LED 100 will be lit when utility power is available. Upon interruption of utility power, the switch 48 is actuated so that actual generator power and voltage is delivered to the load 102 and displayed by the monitor 62.

It should now be appreciated that the present invention provides a power transfer switching mechanism electronic display 62 of actual generator power and voltage to enable the operator with the ability to ascertain the condition of the electrical system. The display 62 employs a three color LED array to identify good, bad and cautionary levels and can be monitored from a distance of about 25 feet A single LED 100 assures the operator that the generator 10 has not failed but that utility power has been restored.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention as set forth with the following claims.

I claim:

1. In a power transfer arrangement for supplying power from a generator to the electrical system of a building in the event of a utility power interruption, the power transfer arrangement having a power transfer switching mechanism adapted for interconnection with the building electrical system and including a cabinet having panel structure provided with various electrical components for transferring power to various load circuits, the improvement comprising:

a generator status information display mounted on the cabinet for separately measuring and simultaneously displaying only actual wattage and only actual voltage supplied by the generator to the load circuits, wherein the generator status information display includes a variable color wattage display and a variable color voltage display distinguishable from the wattage display.

2. The improvement of claim 1, wherein the generator status information display includes at least a three color LED scheme for indicating acceptable, cautionary and overage conditions.

3. The improvement of claim 2, wherein the generator status information display is comprised of a pair of electronic wattage graphs, each wattage graph being flanked by an electronic voltage graph.

4. The improvement of claim 1, wherein the generator status information display includes a stationary illuminated indicator spaced from the wattage and voltage displays and representing the presence and absence of utility power.

5. The improvement of claim 1, wherein each wattage and voltage display is comprised of a colored bar graph having a plurality of indicating segments, the wattage display being represented by the size of the display of several ascending segments and the voltage display being represented by display of a single segment only.

6. A generator condition monitor for a power transfer switching mechanism adapted for interconnection with a building electrical system during a utility power interruption, the monitor comprising;

at least one climbing bar graph wherein both size and color of the graph are indicative of real time power consumption of the generator, and at least one moving dot graph wherein the relative position and color of the dot are indicative of the real time output voltage of the generator.

7. The generator condition monitor of claim 6, wherein the climbing bar graph and the moving dot graph both employ red, green and yellow LEDs to represent various condition levels of the generator.

8. The generator condition monitor of claim 6, wherein the climbing bar graph includes twenty LED segments and the moving dot graph includes ten LED segments.

9. The generator condition monitor of claim 6 including a single LED indicator representing the availability of utility power.

10. The generator condition monitor of claim 6, wherein the moving dot graph employs red LEDs to signify output voltages below 104 volts and above 136 volts.

11. The generator condition monitor of claim 6, wherein the climbing bar graph employs a red LED to signify power consumption above 100 percent of capacity.

\* \* \* \* \*